US012208415B2

(12) United States Patent
Shaghaghi et al.

(10) Patent No.: US 12,208,415 B2
(45) Date of Patent: Jan. 28, 2025

(54) PROCESS FOR COATING A MAGNET FOR A ROTOR

(71) Applicant: AKZO NOBEL COATINGS INTERNATIONAL B.V., BM Arnhem (NL)

(72) Inventors: Arash Shaghaghi, Lohfelden (DE); Sarah Giersberg, Kaufungen (DE); Thomas Gohmann, Heppenheim (DE); Udo Baumheier, Soest (DE); Birgit Buchmann, Arnsberg (DE)

(73) Assignee: Akzo Nobel Nederland B.V., Arnheim (NL)

( * ) Notice: Subject to any disclaimer, the term of this patent is extended or adjusted under 35 U.S.C. 154(b) by 707 days.

(21) Appl. No.: 17/084,373

(22) Filed: Oct. 29, 2020

(65) Prior Publication Data

US 2021/0138501 A1 May 13, 2021

(30) Foreign Application Priority Data

Nov. 7, 2019 (EP) .................................... 19207688

(51) Int. Cl.
*B05D 1/12* (2006.01)
*C08J 9/232* (2006.01)
(Continued)

(52) U.S. Cl.
CPC ................ *B05D 1/12* (2013.01); *C08J 9/232* (2013.01); *C09D 5/033* (2013.01); *C09D 163/00* (2013.01);
(Continued)

(58) Field of Classification Search
CPC ... C09J 5/06; C09J 5/065; C09J 5/232; B05D 1/12
See application file for complete search history.

(56) References Cited

U.S. PATENT DOCUMENTS 8,778,129 B2 * 7/2014 Bilcai .................... C09J 133/08
156/330
9,790,341 B2 10/2017 Barriau et al.
(Continued)

FOREIGN PATENT DOCUMENTS

CN 101228204 7/2008
CN 102471659 5/2012
(Continued)

OTHER PUBLICATIONS

Extended European Search Report of corresponding 19207688.3, dated Jun. 9, 2020, 9 pages.

*Primary Examiner* — Michael P Wieczorek
(74) *Attorney, Agent, or Firm* — Pauly, DeVries Smith & Deffner LLC

(57) ABSTRACT

The invention relates to a process for coating a magnet to be inserted into a pocket of a rotor comprising the steps of providing a permanent magnet, and applying a dry powder coating comprising a prepolymer, a hardener, at least one functional filler and a blowing agent. In order to avoid premature reaction of the prepolymer, the blowing agent is a chemical blowing agent. Further, the invention relates to a permanent magnet to which a process according to the invention was applied and to a rotor comprising a permanent magnet to which a process according to the invention was applied.

19 Claims, 1 Drawing Sheet

Figure 1A:

(51) Int. Cl.
*C09D 5/03* (2006.01)
*C09D 163/00* (2006.01)

(52) U.S. Cl.
CPC ...... *B05D 2202/00* (2013.01); *B05D 2504/00* (2013.01); *C08J 2363/00* (2013.01)

(56) References Cited

U.S. PATENT DOCUMENTS

| | | |
|---|---|---|
| 2010/0120936 A1 | 5/2010 | Lamon |
| 2012/0161565 A1 | 6/2012 | Bilcai et al. |
| 2012/0207925 A1 | 8/2012 | Hornung et al. |
| 2017/0081555 A1* | 3/2017 | Chene ..................... C08L 51/04 |
| 2019/0097478 A1* | 3/2019 | Katayama ................ H02K 1/32 |
| 2019/0270879 A1 | 9/2019 | Hanley |
| 2019/0292427 A1* | 9/2019 | Meistermann ........... C08J 9/106 |

FOREIGN PATENT DOCUMENTS

| | | |
|---|---|---|
| DE | 10 2014 214 381 A1 | 1/2016 |
| EP | 1 590 145 A0 | 11/2005 |
| WO | WO 2004/062869 A2 | 7/2004 |

\* cited by examiner

PROCESS FOR COATING A MAGNET FOR A ROTOR

CROSS-REFERENCE TO RELATED APPLICATION(S)

This application claims priority to European Patent Application Number 19207688.3, filed on Nov. 7, 2019, the entire content of which is incorporated herein by reference.

The invention relates to a process for coating a magnet to be inserted into a pocket of a rotor comprising the steps of providing a permanent magnet, and applying a dry powder coating comprising a prepolymer, a hardener, at least one functional filler and a blowing agent, characterized in that the blowing agent is a chemical blowing agent. Further, the invention relates to a permanent magnet to which a process according to the invention was applied and to a rotor comprising a permanent magnet to which a process according to the invention was applied.

Permanent magnet excited electrical machines are characterized by a stator carrying electrical windings and a rotor mounted rotatably relative thereto, which carries a plurality of permanent magnets, with whose magnetic field the windings of the stator interact during operation of the electric machine.

A problem in the manufacture of rotors of excited electrical machines is the fixing of the permanent magnets on the laminated core or stack of the rotor. In particular, the fixation, which typically takes place in tubular pockets of the body, must be done tangentially and radially very precisely in order to avoid imbalances of the rotor. This is due to the fact that imbalances may be harmful, especially in high-performance machines. On the other hand, an economic production of the laminated cores and the permanent magnets is not possible without relatively large manufacturing tolerances.

Simply gluing the magnet on the rotor does not fulfill these requirements.

Therefore, in the state of the art, for instance in EP 2462202 B1 or DE102014214381A1, a process comprising the steps of providing a plurality of permanent magnets and coating the permanent magnets with a coating containing a matrix with embedded thermally expandable microspheres is described. Further the process comprises providing a rotor body with oversized recesses, or pockets, for receiving the coated permanent magnets, inserting the coated permanent magnets in the recesses of the rotor body, temporary heating of the rotor body together with coated permanent magnets to a process temperature above the expansion temperature of the thermally expandable microspheres.

Thermally expandable microspheres increase significantly and irreversibly in volume under the influence of temperature. This is in particular the case if a temperature is applied which is above the so-called expansion temperature of the microspheres. If a rotor which had been equipped with a coated permanent magnet is heated to a process temperature above the expansion temperature of the thermally expandable microspheres, the plastic matrix initially melts or softens. The microspheres will then expand. In turn, the softened matrix offers little resistance. As a result, the total coating thickness of the permanent magnets increases and may fill the gaps between the permanent magnets and the surrounding pocket wall. Hence, a self-centering of the permanent magnets in the fixation pockets takes place. This process stops due to the irreversibility of the expansion of the microspheres after cooling.

However, it was recently found that the microspheres can react with the prepolymer even at room temperature. Therefore, the epoxide is consumed prematurely and, hence, in parts, it is not available for filling the gaps between the permanent magnets in order to adhere the permanent magnets to the fixation pockets. Further, the premature reaction of the coating reduces the overall structural stability of the coated magnets during transport and storage.

The problem to be solved by the present invention can therefore be seen in providing an improved process for adhering a permanent magnet to a rotor, in particular avoiding premature reaction of the prepolymer.

This problem is solved by the subject-matter of the claims.

According to a first aspect, the invention describes process for coating a magnet to be inserted into a pocket of a rotor comprising the steps of providing a permanent magnet, and applying a dry powder coating comprising a prepolymer, a hardener, at least one functional filler and a blowing agent, characterized in that the blowing agent is a chemical blowing agent.

In this way, despite large manufacturing tolerances of permanent magnets and the rotor bodies an accurate positioning of the permanent magnets can be achieved.

Furthermore, the functional filler improves the thermal conduction between magnet and laminated core or stack of the rotor and can also increase the stability of the coating at very high temperatures, in particular above 150° C. By means of the functional filler, the magnet will not move at high temperatures (because of centrifugal forces) even though parts of the coating might soften at high temperatures.

A blowing agent is a substance which is capable of producing a cellular structure via a foaming process thereby expanding the matrix material, i.e. the material in which it is embedded. Since according to the present invention, the expanded coating of the rotor is used to "adhere" the magnet to the rotor pocket, the matrix may be referred to as "adhesive" matrix.

With respect to the invention, it needs to be differentiated between physical blowing agents and chemical blowing agents.

Physical blowing agents, according to the present invention, are blowing agents which, upon activation, remain essentially unaltered chemically. Physical blowing agents may be for instance CFCs, HCFCs, hydrocarbons e.g. pentane, isopentane, cyclopentane, liquid $CO_2$. In these cases, the expansion work to be performed is achieved without a chemical reaction of the blowing agents. Further physical blowing agents are microspheres. These microspheres expand upon activation and therefore result in an expansion of the coating. Although, the expansion of the microspheres may in principle be induced by a chemical reaction, such a chemical reaction would only be inside the microspheres— the microspheres as an entity are considered as physical blowing agents.

In contrast, chemical blowing agents, according to the present invention, are blowing agents which, upon activation, are altered chemically and which are directly immersed in the coating matrix, i.e. which are not inside of microspheres. For instance, due to gas evolution and gas expansion, the chemically acting blowing agent, upon activation, increases the volume of the coating matrix (irreversibly after curing). The expanded coating of the rotor therefore results in a fixation of the magnet to the rotor pocket. In contrast to physical blowing agents, as for instance microspheres, a chemical blowing agent is intermingled with the coating matrix and, upon activation, the chemical blowing agent reacts for instance in such a way that a moiety is released which acts as a gas and therefore expands the coating matrix. Preferably, the chemical blowing agent decomposes upon heating. It was found that such chemical blowing agents do not prematurely react with the coating matrix. Therefore, the pre-polymer is not consumed prematurely and, hence, remains available for filling the gaps between the permanent magnets and adhering the permanent magnets to the fixation pockets. Further, since no premature reaction of the coating, in particular the prepolymer, takes place, the overall structural stability of the coated magnets during transport and storage is retained.

Chemical blowing agents include for instance isocyanate, azodicarbonamide, hydrazine and other nitrogen-based materials and sodium bicarbonate. Gaseous products and other byproducts are formed by a chemical reaction of the chemical blowing agent, promoted by the heat of the foam production process or a reacting polymer's exothermic heat. Since the blowing reaction occurs forming low molecular weight compounds acting as the blowing gas, additional exothermic heat may be released. Once formed the low molecular weight compounds will never revert to the original blowing agent. Hence, the reaction is preferably irreversible.

Mixed physical/chemical blowing agents may be used according to the present invention. Here both the chemical and physical blowing are used in tandem to balance each other out with respect to thermal energy released and absorbed, minimizing temperature rise. Otherwise excessive exothermic heat because of high loading of a physical blowing agent can cause thermal degradation and structural instability. Nevertheless, preferably, only a chemical blowing agent is used, in particular in the absence of microspheres as physical blowing agent and in particular in the absence of any physical blowing agent.

"Activation of the chemical blowing agent" is understood as an operation that induces the expansion process by initiating the reaction of the chemical blowing agent. This can be an irradiation with high-energy radiation e.g. electron irradiation, electromagnetic induction, ultrasound, laser or UV radiation, visible light, or the chemical blowing agent is heated to a temperature at which a chemical reaction of the blowing agent occurs. According to a preferred embodiment, the induction process, for instance irradiation with high-energy radiation and/or heating, results in a decomposition of the chemical blowing. In a particular embodiment, the induction process, for instance by irradiation with high-energy radiation and/or heating results in a decomposition of the chemical blowing agent. In a particular embodiment, the induction process, for instance by irradiation with high-energy radiation and/or heating results in a decomposition of the chemical blowing agent, wherein the decomposition results in the formation of gas, which at least partly results in the expansion of the matrix.

Functional filler can be for instance calcium carbonate and/or barium sulfate and/or glass fibers and/or metallic particles.

All in all, the process as described allows for an accurate positioning of the magnets in the center of the rotor pocket, even in the presence of relatively large production tolerances. The process described does not require any additional adhesives and, in use, will provide good protection against vibrations. Due to the even expansion of the matrix of the powder coating, the magnets are accurately and fully adhered, i.e. fixed in the pockets of the rotor.

Powder coating systems are generally known to the person skilled in the art. They may comprise binders and additives to which colorants and fillers may be added.

According to an embodiment the invention describes a process for coating a magnet, wherein the prepolymer is an epoxide prepolymer. Epoxy resins are pre-polymers of relatively low molecular weight which normally contain at least two epoxide groups. The epoxide group may be designated as a glycidyl or oxirane group.

A wide range of epoxy resins are manufactured industrially. Epoxy polymers, obtained by reaction of the prepolymers, are polymeric or semi-polymeric materials. Variable chain length results from the polymerization reaction. Mainly, the raw materials for epoxy resin production are derived from petroleum. An important criterion for epoxy resins is the epoxide group content. This is expressed as the specific amount of substance of epoxide groups in the material in question. This is calculated as the ratio of the amount of substance of epoxide groups in this material divided by the mass of the material under consideration, in this case, the mass of the resin. The inverse of the epoxide number is called the "epoxide equivalent weight", which is the ratio of the mass of a sample of the epoxy resin and the amount of epoxide groups present in that material. In principle, according to the present invention, a variety of epoxy prepolymers and, after polymerization, epoxy polymers can be employed. Epoxies are typically cured with stoichiometric or near-stoichiometric quantities of curative, also called a hardener, to achieve maximum physical properties. Blending different grades of epoxy resin, and addition of additives, plasticizers and/or fillers may be employed to achieve the desired processing properties and final properties. Use of blending, additives and fillers is referred to as formulating.

According to an embodiment the invention describes a process for coating a magnet, wherein the hardener is a non-latent hardener. It is also by a certain temperature but not by separating from a chemical group as in the case of a latent hardener.

According to an embodiment the invention describes a process for coating a magnet, wherein at least one functional filler is added.

"Activation of the prepolymer" is understood as an operation that induces the polymerization reaction of the prepolymer. This can be an irradiation with high-energy radiation, for instance, electron irradiation, electromagnetic induction, ultrasound, laser or UV radiation, visible light, or the prepolymer is heated to a temperature at which a chemical reaction of hardener induces the polymerization reaction. According to a preferred embodiment, the induction process, for instance irradiation with high-energy radiation and/or heating, results in an activation of the hardener which in turn initiates the polymerization process.

According to an embodiment the invention describes a process for coating a magnet, wherein the powder finish is free of elastomers.

By gas evolution and gas expansion, the chemically acting blowing agent, upon activation, increases the volume of the coating matrix (irreversibly after curing). In contrast to physical blowing agents, as for instance microspheres, the chemical blowing agent provides a homogeneous and stable matrix for the magnet in the rotor pocket even without additional elastomeric polymers. All in all, inter alia due to the chemical blowing agent, a homogenous matrix with excellent sealing and adhesion is obtained. No further elastomers are required to stabilize the matrix.

According to an embodiment, the invention describes a process for coating a magnet, wherein the powder finish is free of physical blowing agents.

According to an embodiment, the invention describes a process for coating a magnet, wherein the process further comprises the step of melting the powder coating to form a coating on the permanent magnet, preferably by applying a temperature of at least 80° C. Advantageously, this allows the coated magnet being inserted into a pocket of a rotor.

According to an embodiment the invention describes a process for coating a magnet, wherein the process comprises a step of inserting the permanent magnet into a pocket of a rotor.

According to an embodiment the invention describes a process for coating a magnet, wherein the process comprises a step of heating the permanent magnet which was inserted into the pocket of a rotor in order to induce hardening of the pre-polymer.

According to an embodiment the invention describes a process for coating a magnet, wherein the process comprises a step of heating the permanent magnet which was inserted into the pocket of a rotor in order to induce decomposition of a chemical blowing agent for expanding the coating.

According to an embodiment the invention describes a process for coating a magnet, wherein the process comprises a step of heating the permanent magnet which was inserted into the pocket of a rotor in order to induce hardening of the pre-polymer and concomitantly induce decomposition of a chemical blowing agent for expanding the coating.

According to an embodiment of the method described, coating of the magnets with the powder can be carried out separated in space and time from the bonding of the magnets in the pockets of the rotor. Hence, the magnets can be coated and are inserted into the rotor and/or stator, preferably the rotor, afterwards. Coating of the magnets with the adhesive can thus be done in a specially equipped department, or by a magnet manufacturer or magnet supplier. Therefore, the described methods can be carried out flexibly and cost efficient. The powder can be sprayed or extruded or over-molded onto the magnets. The powder is preferably sprayed onto the magnets. Further, the powder can be laminated onto the magnets as a film. The coated magnets can then be temporarily stored and/or transported from the coating location to the bonding location, No adhesive application takes place in the assembly operation, where the magnets are installed. Handling of the powder at the location where the rotors are produced is eliminated. Thereby, contamination as a result of improperly applied powder can therefore be avoided. Further, the described method is highly flexible.

According to an embodiment the invention describes a process for coating a magnet, wherein the process further comprises the step of expanding the coating film on the permanent magnet and hardening of the prepolymer, preferably by applying a temperature from 180° C. to 260° C. Preferably, the hardening of the prepolymer and the expansion due to the chemical blowing agent are done concomitantly by heating, preferably by applying a temperature from 180° C. to 260° C. Keeping the temperature below 260° C. reduces the risk of degradation of the prepolymer which could reduce the functionality of the coating.

According to another aspect of the invention, a permanent magnet is described to which a process according to the invention was applied.

According to another aspect of the invention, a rotor comprising a permanent magnet to which a process according to the invention was applied is described.

Binders may be epoxy resins, carboxyl- and hydroxyl-containing polyesters, acrylate resins and also modified resins for special fields of use.

Additives influence important parameters, such as the surface structure, the gloss of the surface, the surface hardness and the processing conditions. As leveling agents polyacrylates may be used. Likewise, may be used as additives in powder coating systems. The colorants used can be pigments or dyes.

Finally, fillers serve to increase the volume and to adjust the packing density. Calcium carbonates, but also talcum or barium sulphate may be used as fillers. After mixing the or some of the aforementioned components, the mixture is extruded under heat, cooled and grounded to powder.

Figure 1B:
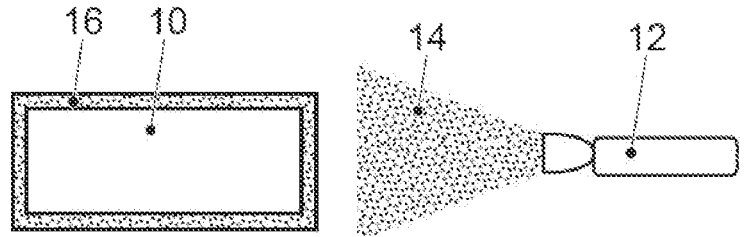
Figure 1C:
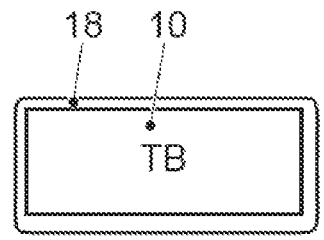
Figure 1D:
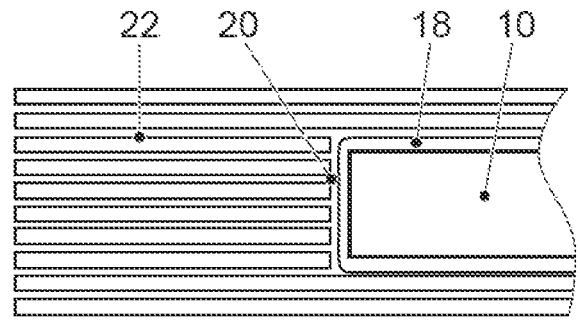
Figure 1E:
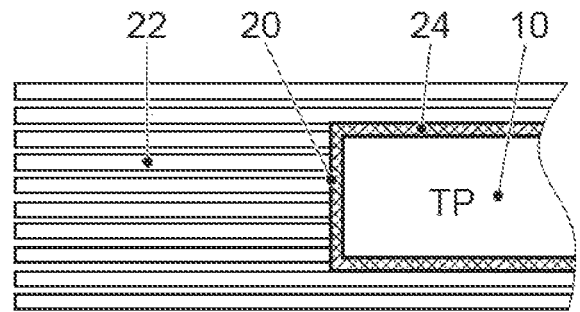

FIGS. 1A-1E are a schematic representation of the method according to the invention. Like reference numerals in the FIGS. indicate like or analogous elements. The FIGS. show the manufacturing method according to the invention for a rotor of an electric machine in five schematic sub-steps.

In a first step a, a permanent magnet 10 is provided.

In a further step b, the provided permanent magnet 10 is sprayed by means of a powder coating system 12 with a dry powder coating 14, so that a uniform powder coating 16 is deposited on the surface of the permanent magnets 10.

In further step c, the powder-coated permanent magnet 10 is subjected to a coating temperature TB, so that the powder coating 16 is converted into a coating 18.

In a further step d, the now permanently coated permanent magnet 10 is inserted into the pockets 20 of a sheet stack 22, which serves as the basic body of the electric machine rotor.

In step e, the sheet stack 22 is heated together with the permanent magnet 10 to the process temperature TP, so that the coating 18 converts into an expanded coating 24. The method according to the invention employs a chemical blowing agent. In contrast to physical blowing agents, as for instance microspheres, the chemical blowing agent, upon activation, reacts for instance in such a way that a moiety is released which acts as an expanding gas and therefore also expands the coating 18 to form the expanded coating 24. In the embodiment shown in FIGS. 1A-1E, the chemical blowing agent decomposes upon heating. Activation of the chemical blowing agent and activation of the prepolymer, i.e. the polymerization reaction of the prepolymer induced by the hardner, take place essentially concomitantly. The chemical blowing agents do not prematurely react with the coating 18. Therefore, the epoxide is not consumed prematurely and, hence, remains available for filling the gaps between the permanent magnets 10 and adhering the permanent magnets 10 to the fixation pockets 20. Further, since no premature reaction of the adhesive takes place, the overall structural stability of the coated magnets 10 during transport and storage is retained.

REFERENCE SIGNS

Permanent magnet 10
Powder coating system 12
Dry powder coating 14
Powder coating 16
Coating temperature TB
Coating 18
Pockets 20
Sheet stack 22
Process temperature TP
Expanded coating 24

The invention claimed is:

1. Process for coating a magnet (10) to be inserted into a pocket (20) of a rotor comprising the steps of
providing a permanent magnet (10), and
applying a dry powder coating (14) to the permanent magnet by spraying so that a uniform powder coating (16) is deposited on the surface of the permanent magnet, the dry powder coating comprising a prepolymer, a hardener, at least one functional filler and a blowing agent, characterized in that the blowing agent is a chemical blowing agent, and the dry powder coating is free of elastomers;
wherein the dry powder coating (14) remains a uniform powder coating (16) after application.

2. The process according to claim 1, characterized in that the prepolymer is an epoxide prepolymer.

3. The process according to claim 2, characterized in that the hardener is a non-latent hardener.

4. The process according to claim 2, characterized in that the dry powder coating (14) is free of physical blowing agents.

5. The process according to claim 2, characterized in that the process further comprises the step of melting the dry powder coating (14) as present on the magnet as a uniform powder coating (16) in order to form a coating (18) on the permanent magnet.

6. The process according to claim 5, characterized in that the process further comprises the step of inserting the permanent magnet (10) into a pocket (20) of a rotor.

7. The process according to claim 6, characterized in that the process further comprises the step of expanding the coating (18) on the permanent magnet (10) and hardening of the prepolymer, in order to form an expanded coating (24).

8. The process according to claim 7, in which a process temperature (TP) of 180° C. to 260° C. is applied.

9. The process according to claim 5, in which a coating temperature (TB) of 80° C. to 120° C. is applied.

10. The process according to claim 1, characterized in that the hardener is a non-latent hardener.

11. The process according to claim 1, characterized in that the dry powder coating (14) is free of physical blowing agents.

12. The process according to claim 1, characterized in that the process further comprises the step of melting the dry powder coating (14) as present on the magnet as a uniform powder coating (16) in order to form a coating (18) on the permanent magnet.

13. The process according to claim 12, characterized in that the process further comprises the step of inserting the permanent magnet (10) into a pocket (20) of a rotor.

14. The process according to claim 13, characterized in that the process further comprises the step of expanding the coating (18) on the permanent magnet (10) and hardening of the prepolymer, in order to form an expanded coating (24).

15. The process according to claim 14, in which a process temperature (TP) of 180° C. to 260° C. is applied.

16. The process according to claim 12, in which a coating temperature (TB) of 80° C. to 120° C. is applied.

17. A permanent magnet (10) to which a process according to claim 7 was applied.

18. A rotor comprising a permanent magnet (10) according to claim 17.

19. A rotor comprising a permanent magnet (10) to which a process according to claim 13 or 14 has been applied.

* * * * *

UNITED STATES PATENT AND TRADEMARK OFFICE
CERTIFICATE OF CORRECTION

Page 1 of 1

PATENT NO. : 12,208,415 B2
APPLICATION NO. : 17/084373
DATED : January 28, 2025
INVENTOR(S) : Arash Shaghaghi et al.

It is certified that error appears in the above-identified patent and that said Letters Patent is hereby corrected as shown below:

On the Title Page

Item (73), "Akzo Nobel Nederland B.V." should read --AKZO NOBEL COATINGS INTERNATIONAL B.V.--

Signed and Sealed this
Twenty-second Day of July, 2025

Coke Morgan Stewart
*Acting Director of the United States Patent and Trademark Office*